(12) United States Patent
Ito et al.

(10) Patent No.: US 11,929,507 B2
(45) Date of Patent: Mar. 12, 2024

(54) BINDER COMPOSITION FOR NON-AQUEOUS SECONDARY BATTERY ELECTRODE, SLURRY COMPOSITION FOR NON-AQUEOUS SECONDARY BATTERY ELECTRODE AND METHOD OF PRODUCING SAME, ELECTRODE FOR NON-AQUEOUS SECONDARY BATTERY, AND NON-AQUEOUS SECONDARY BATTERY

(71) Applicant: ZEON CORPORATION, Tokyo (JP)

(72) Inventors: Yukie Ito, Tokyo (JP); Kenya Sonobe, Tokyo (JP); Maki Mesuda, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 621 days.

(21) Appl. No.: 17/251,814

(22) PCT Filed: Jun. 27, 2019

(86) PCT No.: PCT/JP2019/025534
§ 371 (c)(1),
(2) Date: Dec. 14, 2020

(87) PCT Pub. No.: WO2020/004526
PCT Pub. Date: Jan. 2, 2020

(65) Prior Publication Data
US 2021/0119215 A1    Apr. 22, 2021

(30) Foreign Application Priority Data
Jun. 29, 2018  (JP) .................................. 2018-124649

(51) Int. Cl.
| | | |
|---|---|---|
| *H01M 4/62* | (2006.01) | |
| *C08F 220/14* | (2006.01) | |
| *C08L 25/12* | (2006.01) | |
| *C08L 33/20* | (2006.01) | |
| *H01M 10/0525* | (2010.01) | |
| *H01M 4/02* | (2006.01) | |

(52) U.S. Cl.
CPC .......... *H01M 4/622* (2013.01); *C08F 220/14* (2013.01); *C08L 25/12* (2013.01); *C08L 33/20* (2013.01); *H01M 10/0525* (2013.01); *C08F 2800/20* (2013.01); *H01M 2004/021* (2013.01)

(58) Field of Classification Search
CPC .... C08F 212/08; C08F 220/06; C08F 220/14; C08F 220/1804; C08F 220/20; C08F 220/40; C08F 220/44; C08F 222/02; C08F 236/06; C08F 2800/20; C08L 2203/20; C08L 2205/025; C08L 2205/03; C08L 2205/035; C08L 25/10; C08L 25/12; C08L 33/12; C08L 33/20; C09D 125/10; H01M 10/0525; H01M 2004/021; H01M 4/13; H01M 4/622; Y02E 60/10
See application file for complete search history.

(56) References Cited

U.S. PATENT DOCUMENTS

| | | |
|---|---|---|
| 11,387,457 B2 | 7/2022 | Yamamoto |
| 2004/0020763 A1 | 2/2004 | Kanzaki et al. |
| 2013/0330622 A1 | 12/2013 | Sasaki |
| 2019/0044147 A1 | 2/2019 | Yamamoto |
| 2019/0044148 A1 | 2/2019 | Yamamoto |

FOREIGN PATENT DOCUMENTS

| | | |
|---|---|---|
| CN | 107925089 A | 4/2018 |
| JP | 2003100298 A | 4/2003 |
| JP | 2004185826 A | 7/2004 |
| JP | 2012204303 A | 10/2012 |
| JP | 2013179040 A | 9/2013 |
| WO | 0239518 A1 | 5/2002 |
| WO | 2012115096 A1 | 8/2012 |
| WO | 2015064099 A1 | 5/2015 |
| WO | 2017056404 A1 | 4/2017 |
| WO | 2017141791 A1 | 8/2017 |

OTHER PUBLICATIONS

Dec. 29, 2020, International Preliminary Report on Patentability issued in the International Patent Application No. PCT/JP2019/025534.
Sep. 24, 2019, International Search Report issued in the International Patent Application No. PCT/JP2019/025534.

*Primary Examiner* — Victoria H Lynch
(74) *Attorney, Agent, or Firm* — KENJA IP LAW PC

(57) ABSTRACT

A binder composition contains an organic solvent and a binder that includes a particulate polymer A and a highly soluble polymer B. The particulate polymer A includes an ethylenically unsaturated acid monomer unit in a proportion of not less than 1.0 mass % and not more than 10.0 mass % and a (meth)acrylic acid ester monomer unit in a proportion of not less than 30.0 mass % and not more than 98.0 mass %. The particulate polymer A includes two particulate polymers A1 and A2 having different volume-average particle diameters. The volume-average particle diameters $D50_{A1}$ and $D50_{A2}$ of these particulate polymers A1 and A2 satisfy a formula: $D50_{A2} > D50_{A1} \geq 50$ nm.

8 Claims, No Drawings

BINDER COMPOSITION FOR NON-AQUEOUS SECONDARY BATTERY ELECTRODE, SLURRY COMPOSITION FOR NON-AQUEOUS SECONDARY BATTERY ELECTRODE AND METHOD OF PRODUCING SAME, ELECTRODE FOR NON-AQUEOUS SECONDARY BATTERY, AND NON-AQUEOUS SECONDARY BATTERY

TECHNICAL FIELD

The present disclosure relates to a binder composition for a non-aqueous secondary battery electrode, a slurry composition for a non-aqueous secondary battery electrode and method of producing the same, an electrode for a non-aqueous secondary battery, and a non-aqueous secondary battery.

BACKGROUND

Non-aqueous secondary batteries such as lithium ion secondary batteries have characteristics such as compact size, light weight, high energy-density, and the ability to be repeatedly charged and discharged, and are used in a wide variety of applications. Consequently, in recent years, studies have been made to improve battery members such as electrodes for the purpose of achieving even higher non-aqueous secondary battery performance.

An electrode used in a non-aqueous secondary battery (hereinafter, also referred to simply as a "secondary battery") such as a lithium ion secondary battery normally includes a current collector and an electrode mixed material layer (positive electrode mixed material layer or negative electrode mixed material layer) formed on the current collector. This electrode mixed material layer is formed by, for example, applying a slurry composition containing an electrode active material, a binder-containing binder composition, and so forth onto the current collector, and then drying the applied slurry composition.

In recent years, attempts have been made to improve binder compositions and slurry compositions used in the formation of electrode mixed material layers in order to further improve secondary battery performance.

For example, Patent Literature (PTL) 1 proposes a slurry composition for a lithium ion secondary battery positive electrode that contains a conductive material having a BET specific surface area of 400 $m^2/g$ or more and a specific binder. Features of the slurry composition for a positive electrode according to PTL 1 are that the slurry composition contains (1) a fluorine-containing polymer X, (2) a polymer Y including a nitrile group-containing monomer unit in a proportion of 10 mass % to 50 mass %, and (3) a polymer Z including a (meth)acrylic acid alkyl ester monomer unit in a proportion of 50 mass % to 90 mass % as the binder, and the proportion constituted by the polymer X among the overall binder is 50 mass % to 95 mass %. The slurry composition for a positive electrode has excellent viscosity stability and can improve cycle characteristics and rate characteristics of a lithium ion secondary battery.

Moreover, PTL 2 proposes a binder composition for a secondary battery positive electrode that is a binder containing a nitrile group-containing polymerization unit, an aromatic vinyl polymerization unit, a hydrophilic group-containing polymerization unit, and a linear alkylene polymerization unit having a carbon number of 4 or more, and in which the proportional content of the aromatic vinyl polymerization unit is 5 mass % to 50 mass %. The binder composition for a positive electrode according to PTL 2 makes it possible to form an electrode having excellent flexibility and to enhance high-temperature cycle characteristics of a secondary battery.

CITATION LIST

Patent Literature

PTL 1: WO2015/064099A1
PTL 2: JP2013-179040A

SUMMARY

Technical Problem

In recent years, there has been demand for further enhancing battery characteristics such as rate characteristics and high-temperature storage characteristics (hereinafter, also referred to simply as "battery characteristics") of secondary batteries. However, the conventional binder compositions and slurry compositions described above leave room for improvement in terms of achieving a balance of sufficiently high levels of sufficiently increasing adhesiveness between an electrode mixed material layer and a current collector in an obtained electrode and enhancing battery characteristics.

Accordingly, one object of the present disclosure is to provide a binder composition for a non-aqueous secondary battery electrode that can be suitably used to form an electrode mixed material layer having sufficiently high adhesiveness with a current collector (i.e., having sufficiently high peel strength) and that can enhance battery characteristics of a secondary battery including an obtained electrode.

Another object of the present disclosure is to provide a slurry composition for a non-aqueous secondary battery electrode, and method of producing the same, that can form an electrode mixed material layer having excellent peel strength and that can enhance battery characteristics of a secondary battery including an obtained electrode.

Yet another object of the present disclosure is to provide an electrode for a non-aqueous secondary battery that can sufficiently improve battery characteristics of a non-aqueous secondary battery and a non-aqueous secondary battery that has excellent battery characteristics such as rate characteristics and high-temperature storage characteristics.

Solution to Problem

The inventors conducted diligent investigation with the aim of solving the problems described above. The inventors discovered that an electrode mixed material layer having sufficiently high peel strength can be formed and battery characteristics of a secondary battery including an obtained electrode can be enhanced by using a binder composition for a non-aqueous secondary battery electrode containing a particulate polymer having a specific chemical composition and particle diameter and a non-particulate polymer as binders. In this manner, the inventors completed the present disclosure.

Specifically, the present disclosure aims to advantageously solve the problems set forth above, and a presently disclosed binder composition for a non-aqueous secondary battery electrode comprises a binder and an organic solvent, wherein the binder includes a particulate polymer A and a highly soluble polymer B, the particulate polymer A includes an ethylenically unsaturated acid monomer unit in a proportion of not less than 1.0 mass % and not more than 10.0 mass % and includes a (meth)acrylic acid ester monomer unit in a proportion of not less than 30.0 mass % and not more than 98.0 mass %, and the particulate polymer A includes a particulate polymer A1 having a volume-average particle diameter of $D50_{A1}$ and a particulate polymer A2 having a volume-average particle diameter of $D50_{A2}$, where $D50_{A1}$ and $D50_{A2}$ satisfy a formula: $D50_{A2} > D50_{A1} \geq 50$ nm. Through a binder composition obtained by using a highly soluble polymer B and, in combination therewith, at least two polymers having different volume-average particle diameters as a particulate polymer A satisfying specific chemical composition conditions in this manner, it is possible to form an electrode mixed material layer having sufficiently high peel strength and to enhance battery characteristics of a secondary battery including an obtained electrode.

Note that the "proportion of a monomer unit" in a given polymer can be measured by a nuclear magnetic resonance (NMR) method such as $^1$H-NMR. Moreover, the phrase "includes a monomer unit" means that "a polymer obtained with the monomer includes a repeating unit derived from the monomer". Also note that in the present specification, "(meth)acryl" is used to indicate "acryl" or "methacryl". Furthermore, a method described in the EXAMPLES section can be used to judge whether a given polymer is "highly soluble". Also, the "volume-average particle diameter" of a polymer can be measured by a method described in the EXAMPLES section.

In the presently disclosed binder composition for a non-aqueous secondary battery electrode, a mixture of the particulate polymer A and the highly soluble polymer B preferably has a degree of swelling in electrolyte solution of not less than 150% and not more than 500%. When the degree of swelling in electrolyte solution of a mixture of the particulate polymer A and the highly soluble polymer B is within the range set forth above, the flexibility of an obtained electrode can be increased, and rate characteristics of a secondary battery including the electrode can be further enhanced.

Note that the "degree of swelling in electrolyte solution" of a mixture of the particulate polymer A and the highly soluble polymer B can be measured by a method described in the EXAMPLES section.

In the presently disclosed binder composition for a non-aqueous secondary battery electrode, the highly soluble polymer B preferably includes either or both of a highly soluble polymer B1 that has an iodine value of not less than 3 g/100 g and not more than 80 g/100 g and in which proportional content of a nitrile group-containing monomer unit is 60.0 mass % or less and a highly soluble polymer B2 that includes a nitrile group-containing monomer unit in a proportion of not less than 70.0 mass % and not more than 98.0 mass %. When at least one of the highly soluble polymers B1 and B2 satisfying the conditions set forth above is contained as the highly soluble polymer B, which is present in a non-particulate form in the organic solvent, it is possible to form an electrode mixed material layer having even higher peel strength and to further enhance battery characteristics of a secondary battery including an obtained electrode.

Note that the "iodine value" of a polymer can be measured by a method described in the EXAMPLES section.

In the presently disclosed binder composition for a non-aqueous secondary battery electrode, a content ratio of the particulate polymer A and the highly soluble polymer B is preferably 5:95 to 50:50. When the content ratio (by mass) of the particulate polymer A and the highly soluble polymer B is within the range set forth above, it is possible to form an electrode mixed material layer having even higher peel strength and to further enhance high-temperature storage characteristics of a secondary battery including an obtained electrode.

Moreover, the present disclosure aims to advantageously solve the problems set forth above, and a presently disclosed slurry composition for a non-aqueous secondary battery electrode comprises: any one of the binder compositions for a non-aqueous secondary battery electrode set forth above; and an electrode active material. By compounding an electrode active material and a binder composition for a non-aqueous secondary battery electrode containing the polymer A set forth above in this manner, it is easy to obtain a slurry composition for a non-aqueous secondary battery electrode that can form an electrode mixed material layer having high peel strength and that can enhance battery characteristics of a secondary battery including an obtained electrode.

Furthermore, the present disclosure aims to advantageously solve the problems set forth above, and a presently disclosed method of producing a slurry composition for a non-aqueous secondary battery electrode comprises a mixing step of mixing the electrode active material, the polymer A1, the polymer A2, the highly soluble polymer B, and the organic solvent. The presently disclosed production method enables efficient production of the presently disclosed slurry composition for a non-aqueous secondary battery electrode set forth above.

Also, the present disclosure aims to advantageously solve the problems set forth above, and a presently disclosed electrode for a non-aqueous secondary battery comprises an electrode mixed material layer formed using the slurry composition for a non-aqueous secondary battery electrode set forth above. Use of the slurry composition for a non-aqueous secondary battery electrode set forth above in this manner enables good formation of an electrode mixed material layer having high peel strength and sufficient improvement of battery characteristics of a secondary battery in which an electrode for a non-aqueous secondary battery is used.

Moreover, the present disclosure aims to advantageously solve the problems set forth above, and a presently disclosed non-aqueous secondary battery comprises the electrode for a non-aqueous secondary battery set forth above. Use of the electrode for a non-aqueous secondary battery set forth above in this manner enables sufficient improvement of battery characteristics such as rate characteristics and high-temperature storage characteristics.

Advantageous Effect

According to the present disclosure, it is possible to provide a binder composition for a non-aqueous secondary battery electrode that can be suitably used to form an electrode mixed material layer having sufficiently high adhesiveness with a current collector (i.e., having sufficiently high peel strength) and that can enhance battery characteristics of a secondary battery including an obtained electrode.

Moreover, according to the present disclosure, it is possible to provide a slurry composition for a non-aqueous secondary battery electrode, and method of producing the same, that can form an electrode mixed material layer having excellent peel strength and that can enhance battery characteristics of a secondary battery including an obtained electrode.

Furthermore, according to the present disclosure, it is possible to provide an electrode for a non-aqueous secondary battery that can sufficiently improve battery characteristics of a non-aqueous secondary battery and a non-aqueous secondary battery that has excellent battery characteristics such as rate characteristics and high-temperature storage characteristics.

DETAILED DESCRIPTION

The following provides a detailed description of embodiments of the present disclosure.

The presently disclosed binder composition for a non-aqueous secondary battery electrode can be used in production of a slurry composition for a non-aqueous secondary battery electrode. Moreover, a slurry composition for a non-aqueous secondary battery electrode produced using the presently disclosed binder composition for a non-aqueous secondary battery electrode can be used in formation of an electrode of a non-aqueous secondary battery such as a lithium ion secondary battery. Note that the presently disclosed slurry composition for a non-aqueous secondary battery electrode can be efficiently produced by the presently disclosed method of producing a slurry composition for a non-aqueous secondary battery electrode. Furthermore, a feature of the presently disclosed non-aqueous secondary battery is that an electrode for a non-aqueous secondary battery formed using the presently disclosed slurry composition for a non-aqueous secondary battery electrode is used therein.

Note that the presently disclosed binder composition for a non-aqueous secondary battery electrode and slurry composition for a non-aqueous secondary battery electrode are particularly suitable for use in formation of a positive electrode of a non-aqueous secondary battery.

(Binder Composition for Secondary Battery Electrode)

The presently disclosed binder composition for a non-aqueous secondary battery electrode is a binder composition for a non-aqueous secondary battery electrode that contains a binder and an organic solvent. A feature of the presently disclosed binder composition for a non-aqueous secondary battery electrode is that the binder includes: a particulate polymer A including an ethylenically unsaturated acid monomer unit in a proportion of not less than 1.0 mass % and not more than 10.0 mass % and including a (meth)acrylic acid ester monomer unit in a proportion of not less than 30.0 mass % and not more than 98.0 mass %; and a highly soluble polymer B. Moreover, the particulate polymer A includes a particulate polymer A1 having a volume-average particle diameter of $D50_{A1}$ and a particulate polymer A2 having a volume-average particle diameter of $D50_{A2}$, where $D50_{A1}$ and $D50_{A2}$ satisfy a formula: $D50_{A2} > D50_{A1} \geq 50$ nm. The presently disclosed binder composition for a non-aqueous secondary battery electrode may also contain any other binder in addition to the particulate polymer A and the highly soluble polymer B as the binder.

The presently disclosed binder composition for a non-aqueous secondary battery electrode (hereinafter, also referred to simply as a "binder composition") can form an electrode mixed material layer having sufficiently high peel strength and can enhance battery characteristics of a secondary battery including an obtained electrode as a result of containing the particulate polymer A satisfying the chemical composition conditions and volume-average particle diameter conditions set forth above and the highly soluble polymer B. Although the reason for this is not clear, it is presumed to be as follows. Firstly, the particulate polymer A can function to effectively adhere adhered components such as an electrode active material to one another in an electrode mixed material layer through point adhesion with the adhered components. Moreover, the inclusion of at least two particulate polymers A1 and A2 having different volume-average particle diameters as the particulate polymer A enables good holding of adhered components such as an electrode active material in an electrode mixed material layer. Furthermore, as a result of the volume-average particle diameter of the particulate polymer A1, which is a particulate polymer having a smaller particle diameter, being 50 nm or more, it is difficult for the particulate polymer A1 to enter pores or the like that may be present in an electrode active material. This can inhibit the cutting of conduction paths caused by the particulate polymer A1 entering pores of the electrode active material and, as a result, can enhance rate characteristics of a secondary battery. Moreover, the highly soluble polymer B can function to inhibit degradation of an electrode active material under high-temperature conditions by thin-film coating the electrode active material in an electrode mixed material layer. Therefore, the highly soluble polymer B can enhance high-temperature storage characteristics of a secondary battery. Thus, as a result of the presently disclosed binder composition containing the particulate polymer A and the highly soluble polymer B, the presently disclosed binder composition can form an electrode mixed material layer having sufficiently high peel strength and can enhance battery characteristics (rate characteristics and high-temperature storage characteristics) of a secondary battery including the electrode mixed material layer.

<Particulate Polymer A>

The particulate polymer A is a component that, in an electrode produced by forming an electrode mixed material layer on a current collector using a slurry composition that contains the binder composition, holds components contained in the electrode mixed material layer so that these components do not become detached from the electrode mixed material layer (i.e., functions as a binder). Note that a method described in the EXAMPLES section can be used to confirm whether the particulate polymer A has a "particulate form" in the organic solvent.

[Volume-Average Particle Diameter]

The particulate polymer A is required to include a particulate polymer A1 and a particulate polymer A2 having different volume-average particle diameters. Moreover, the volume-average particle diameter of the particulate polymer A2 is required to be larger than the volume-average particle diameter of the particulate polymer A1, and the volume-average particle diameter of the particulate polymer A1 is required to be 50 nm or more. Note that the volume-average particle diameters of the particulate polymers A1 and A2 are the volume-average particle diameters thereof in the organic solvent that is contained in the presently disclosed binder composition/slurry composition (N-methyl-2-pyrrolidone (NMP) in the subsequently described examples). The volume-average particle diameters of the particulate polymers A1 and A2 can be controlled by a known method such as by adjusting the additive amount of an additive and/or the polymerization time in synthesis of the particulate polymers A1 and A2. For example, in a case in which polymerization is performed by emulsion polymerization, the volume-average particle diameter of an obtained polymer can be reduced by increasing the amount of an emulsifier and the volume-average particle diameter of the obtained polymer can be increased by reducing the amount of the emulsifier.

Note that in addition to the particulate polymer A1 and the particulate polymer A2, the particulate polymer A may include one or a plurality of other polymers having a larger volume-average particle diameter than the particulate polymer A2. In other words, the particulate polymer A may be composed of three or more particulate polymers having different volume-average particle diameters, but it is a requirement that the particulate polymer having the smallest volume-average particle diameter is the particulate polymer A1 and that the particulate polymer having the next smallest volume-average particle diameter after the particulate polymer A1 is the particulate polymer A2.

The volume-average particle diameter of the particulate polymer A1 is preferably 75 nm or more, and more preferably 100 nm or more, and is preferably less than 300 nm, and more preferably 250 nm or less. When the volume-average particle diameter of the particulate polymer A1 is not less than any of the lower limits set forth above, the particulate polymer A1 can be inhibited from entering pores or the like that may be present in an electrode active material, and cutting of conduction paths is less likely to occur as previously described, which makes it possible to enhance rate characteristics of an obtained secondary battery. Moreover, when the volume-average particle diameter of the particulate polymer A1 is not more than any of the upper limits set forth above, point adhesion with adhered components can be formed with sufficient frequency and the peel strength of an obtained electrode mixed material layer can be further increased due to increased specific surface area of the particulate polymer A1.

The volume-average particle diameter of the particulate polymer A2 is preferably 300 nm or more, and is preferably 600 nm or less, more preferably 550 nm or less, and even more preferably 500 nm or less. When the volume-average particle diameter of the particulate polymer A2 is not less than the lower limit set forth above, rate characteristics of an obtained secondary battery can be further enhanced. Moreover, when the volume-average particle diameter of the particulate polymer A2 is not more than any of the upper limits set forth above, it is possible to inhibit excessive reduction of the specific surface area of the particulate polymer A2 making point adhesion with adhered components difficult, and thus it is possible to further increase the peel strength of an obtained electrode mixed material layer.

When the volume-average particle diameter of the particulate polymer A1 is taken to be $D50_{A1}$ and the volume-average particle diameter of the particulate polymer A2 is taken to be $D50_{A2}$, the value of the volume-average particle diameter ratio $D50_{A2}/D50_{A1}$ is required to be more than 1.0, is preferably 1.5 or more, and more preferably 2.0 or more, and is preferably 10.0 or less, and more preferably 8.0 or less. When the value of $D50_{A2}/D50_{A1}$ is 2.0 or more, the peel strength of an obtained electrode mixed material layer can be further increased. Moreover, when the value of $D50_{A2}/D50_{A1}$ is 10.0 or less, rate characteristics of an obtained secondary battery can be further enhanced.

[Chemical Composition of Particulate Polymer A]

The particulate polymer A1 and the particulate polymer A2, which are two types of the particulate polymer A having different volume-average particle diameters, are required to each include an ethylenically unsaturated acid monomer unit and a (meth)acrylic acid ester monomer unit as repeating units. The chemical composition of the particulate polymer A1 and the chemical composition of the particulate polymer A2 may be the same or different. In the following description of chemical composition, the particulate polymer A1 and the particulate polymer A2 are referred to collectively as "particulate polymer A".

The particulate polymer A is, more specifically, required to include an ethylenically unsaturated acid monomer unit in a proportion of not less than 1.0 mass % and not more than 10.0 mass % and to include a (meth)acrylic acid ester monomer unit in a proportion of not less than 30.0 mass % and not more than 98.0 mass %. The particulate polymer A can optionally further include a cross-linkable monomer unit and other monomer units differing from those mentioned above.

[Ethylenically Unsaturated Acid Monomer Unit]

The ethylenically unsaturated acid monomer unit is a repeating unit that is derived from an ethylenically unsaturated acid monomer. The particulate polymer A can display excellent binding capacity as a result of including the ethylenically unsaturated acid monomer unit. Consequently, an electrode mixed material layer formed using a slurry composition that contains the presently disclosed binder composition can display excellent peel strength. Note that the term "ethylenically unsaturated acid monomer unit" as used in the present specification refers to a unit of a monomer that includes an ethylenically unsaturated bond and an acidic group.

Examples of ethylenically unsaturated acid monomers that can form the ethylenically unsaturated acid monomer unit include carboxy group-containing monomers, sulfo group-containing monomers, and phosphate group-containing monomers.

Examples of carboxy group-containing monomers include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, and α-chloro-β-E-methoxyacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Furthermore, an acid anhydride that produces a carboxy group upon hydrolysis can also be used as a carboxy group-containing monomer.

Examples of sulfo group-containing monomers include styrene sulfonic acid, vinyl sulfonic acid, methyl vinyl sulfonic acid, (meth)allyl sulfonic acid, 3-allyloxy-2-hydroxypropane sulfonic acid, and 2-acrylamido-2-methylpropane sulfonic acid.

Note that in the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Note that in the present disclosure, "(meth)acryloyl" is used to indicate "acryloyl" and/or "methacryloyl".

One of these ethylenically unsaturated acid monomers may be used individually, or two or more of these ethylenically unsaturated acid monomers may be used in combination. Of these ethylenically unsaturated acid monomers, acrylic acid, methacrylic acid, itaconic acid, maleic acid, and fumaric acid are preferable from a viewpoint of further improving the peel strength of an obtained electrode mixed material layer, and acrylic acid and methacrylic acid are more preferable.

The proportional content of the ethylenically unsaturated acid monomer unit in the particulate polymer A when all repeating units in the particulate polymer A are taken to be 100.0 mass % is required to be not less than 1.0 mass % and not more than 10.0 mass %, is preferably 1.5 mass % or more, more preferably 2.0 mass % or more, and even more preferably 3.0 mass % or more, and is preferably 8.0 mass % or less, more preferably 6.0 mass % or less, and even more preferably 5.0 mass % or less. When the proportional content of the ethylenically unsaturated acid monomer unit is not less than any of the lower limits set forth above, the peel strength of an electrode mixed material layer formed using a slurry composition that contains the binder composition can be increased. In particular, when the proportional content of the ethylenically unsaturated acid monomer unit is not more than any of the upper limits set forth above, the flexibility of the particulate polymer A can be improved, and, as a result, the peel strength of an obtained electrode mixed material layer can be further improved. High flexibility of the particulate polymer A can also facilitate densification of electrode density in pressing of an electrode mixed material layer.

[(Meth)Acrylic Acid Ester Monomer Unit]

The (meth)acrylic acid ester monomer unit is a repeating unit that is derived from a (meth)acrylic acid ester monomer. In the present specification, "(meth)acryl" is used to indicate "acryl" or "methacryl". As a result of the particulate polymer A including the (meth)acrylic acid ester monomer unit, an obtained electrode mixed material layer can be provided with a suitable degree of affinity with electrolyte solution, and rate characteristics of a secondary battery including the obtained electrode mixed material layer can be improved.

The (meth)acrylic acid ester monomer may be a (meth)acrylic acid alkyl ester monomer in which the number of ethylenically unsaturated bonds is 1. Moreover, the (meth)acrylic acid alkyl ester monomer may be a (meth)acrylic acid alkyl ester monomer that includes a linear alkyl group or a (meth)acrylic acid alkyl ester monomer that includes a branched alkyl group. Examples of (meth)acrylic acid ester monomers include acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. Of these (meth)acrylic acid ester monomers, (meth)acrylic acid alkyl esters in which the alkyl group is a linear alkyl group are preferable from a viewpoint of imparting a suitable degree of affinity with electrolyte solution to an obtained electrode mixed material layer, and butyl acrylate and methyl methacrylate are more preferable. One of these (meth)acrylic acid ester monomers may be used individually, or two or more of these (meth)acrylic acid ester monomers may be used in combination.

The proportional content of the (meth)acrylic acid ester monomer unit in the particulate polymer A when all repeating units included in the particulate polymer A are taken to be 100.0 mass % is required to be not less than 30.0 mass % and not more than 98.0 mass %, is preferably 40.0 mass % or more, and is preferably 98.0 mass % or less, and more preferably 95.0 mass % or less. When the proportional content of the (meth)acrylic acid ester monomer unit in the particulate polymer A is within any of the ranges set forth above, an obtained electrode mixed material layer can be provided with a suitable degree of affinity with electrolyte solution, and rate characteristics of a secondary battery including the electrode mixed material layer can be improved.

[Cross-Linkable Monomer Unit]

The cross-linkable monomer unit is a repeating unit that is derived from a cross-linkable monomer. The cross-linkable monomer is a monomer that can form a cross-linked structure when it is polymerized. When the particulate polymer A includes the cross-linkable monomer unit, the peel strength of an obtained electrode mixed material layer can be further increased. Examples of cross-linkable monomers include monomers that include two or more reactive groups per one molecule.

More specifically, a polyfunctional ethylenically unsaturated carboxylic acid ester monomer that includes two or more ethylenically unsaturated bonds can be used as a cross-linkable monomer.

Examples of difunctional ethylenically unsaturated carboxylic acid ester monomers including two ethylenically unsaturated bonds in a molecule include allyl acrylate, allyl methacrylate, ethylene diacrylate, ethylene dimethacrylate, 2-hydroxy-3-acryloyloxypropyl methacrylate, polyethylene glycol diacrylate, propoxylated ethoxylated bisphenol A diacrylate, ethoxylated bisphenol A diacrylate, 9,9-bis[4-(2-acryloyloxyethoxy)phenyl]fluorene, propoxylated bisphenol A diacrylate, tricyclodecane dimethanol diacrylate, 1,10-decanediol diacrylate, 1,6-hexanediol diacrylate, 1,9-nonanediol diacrylate, polypropylene glycol diacrylate, polypropylene glycol dimethacrylate, polytetramethylene glycol diacrylate, ethylene glycol dimethacrylate, diethylene glycol dimethacrylate, polyethylene glycol dimethacrylate, ethoxylated bisphenol A dimethacrylate, tricyclodecane dimethanol dimethacrylate, 1,10-decanediol dimethacrylate, 1,6-hexanediol dimethacrylate, 1,9-nonanediol dimethacrylate, neopentyl glycol dimethacrylate, ethoxylated polypropylene glycol dimethacrylate, and glycerin dimethacrylate.

Examples of trifunctional ethylenically unsaturated carboxylic acid ester monomers including three ethylenically unsaturated bonds in a molecule include ethoxylated isocyanuric acid triacrylate, ε-caprolactone-modified tris(2-acryloxyethyl) isocyanurate, ethoxylated glycerin triacrylate, pentaerythritol triacrylate, trimethylolpropane triacrylate, and trimethylolpropane trimethacrylate.

Examples of ethylenically unsaturated carboxylic acid ester monomers having a functionality of four or higher that include four or more ethylenically unsaturated bonds in a molecule include di(trimethylolpropane) tetraacrylate, ethoxylated pentaerythritol tetraacrylate, pentaerythritol tetraacrylate, dipentaerythritol polyacrylate, and dipentaerythritol hexaacrylate.

Of these examples, allyl methacrylate (difunctional), ethylene glycol dimethacrylate (difunctional), trimethylolpropane triacrylate (trifunctional), and ethoxylated pentaerythritol tetraacrylate (tetrafunctional) are preferable from a viewpoint of improving the peel strength, flexibility, and so forth of an obtained electrode mixed material layer.

The proportional content of the cross-linkable monomer unit in the particulate polymer A when all repeating units included in the particulate polymer A are taken to be 100.0 mass % is preferably 0.01 mass % or more, more preferably 0.05 mass % or more, and even more preferably 0.1 mass % or more, and is preferably 5.0 mass % or less, more preferably 2.0 mass % or less, and even more preferably 1.5 mass % or less. When the proportional content of the cross-linkable monomer unit in the particulate polymer A is not less than any of the lower limits set forth above, the peel strength of an obtained electrode mixed material layer can be further improved. Moreover, when the proportional content of the cross-linkable monomer unit in the particulate polymer A is not more than any of the upper limits set forth above, the flexibility of an obtained electrode mixed material layer can be improved, and, as a result, the peel strength of the obtained electrode mixed material layer can be further improved.

[Other Monomer Units]

The particulate polymer A may further include other monomer units derived from other monomers that are copolymerizable with the various types of monomers described above. Examples of other monomers that can form such other monomer units include known monomers that can be used in production of a binding component in a binder composition for an electrode of a non-aqueous secondary battery. More specific examples of other monomers include aromatic vinyl monomers described in detail in the "Highly soluble polymer B1" section and nitrile group-containing monomers and basic group-containing monomers described in detail in the "Highly soluble polymer B2" section. One of these other monomers may be used individually, or two or more of these other monomers may be used in combination.

The proportional content of other monomer units in the particulate polymer A when all repeating units in the particulate polymer A are taken to be 100.0 mass % is preferably 50.0 mass % or less, and may be 0.0 mass %.

[Amount of NMP-Insoluble Content]

When the particulate polymer A is mixed in a concentration of 8 mass % with N-methyl-2-pyrrolidone, the amount of insoluble content is preferably 70 mass % or more, more preferably 80 mass % or more, even more preferably 90 mass % or more, and may be 100 mass % (i.e., the particulate polymer A may be insoluble in N-methyl-2-pyrrolidone (hereinafter, also referred to simply as "NMP")). When the amount of NMP-insoluble content is not less than any of the lower limits set forth above, battery characteristics of a secondary battery including an obtained electrode mixed material layer can be further improved. Note that the amount of NMP-insoluble content can be controlled by adjusting the amount of a cross-linkable monomer in a monomer composition used to produce the particulate polymer A. Moreover, the amount of NMP-insoluble content in the particulate polymer A can be measured by a method described in the EXAMPLES section.

[Production Method of Particulate Polymer A]

No specific limitations are placed on the method by which the particulate polymer A set forth above (i.e., the particulate polymers A1 and A2) is produced. The polymerization method in production of the particulate polymer A is not specifically limited and may be a method such as solution polymerization, suspension polymerization, bulk polymerization, or emulsion polymerization. Moreover, ionic polymerization, radical polymerization, living radical polymerization, or the like may be adopted as the polymerization reaction. Examples of emulsifiers, dispersants, polymerization initiators, chain transfer agents, and the like that can be used in polymerization include the same as are typically used.

<Highly Soluble Polymer B>

The highly soluble polymer B is a component that can function to inhibit degradation of a secondary battery (reduction of capacity) under high-temperature conditions by thin-film coating an electrode active material in an electrode mixed material layer. In addition, the highly soluble polymer B is a component that can function as a binder with the particulate polymer A in an electrode mixed material layer. The binder composition preferably contains either or both of a highly soluble polymer B1 that has an iodine value of not less than 3 g/100 g and not more than 80 g/100 g and in which the proportional content of a nitrile group-containing monomer unit is 60.0 mass % or less and a highly soluble polymer B2 that includes a nitrile group-containing monomer unit in a proportion of not less than 70.0 mass % and not more than 98.0 mass % as the highly soluble polymer B, and more preferably contains both the highly soluble polymer B1 and the highly soluble polymer B2 as the highly soluble polymer B. When the binder composition contains both the highly soluble polymer B1 and the highly soluble polymer B2 as the highly soluble polymer B, the peel strength of an obtained electrode mixed material layer and rate characteristics of a secondary battery can be enhanced in a better balance. Note that the binder composition may contain one type or a plurality of types of polymers as each of the highly soluble polymers B1 and B2. Moreover, the binder composition may contain another highly soluble polymer B3 differing from the highly soluble polymers B1 and B2 as the highly soluble polymer B.

[Highly Soluble Polymer B1]

The iodine value of the highly soluble polymer B1 is required to be not less than 3 g/100 g and not more than 80 g/100 g, and is preferably 50 g/100 g or less, more preferably 30 g/100 g or less, and even more preferably 15 g/100 g or less. When the iodine value of the highly soluble polymer B1 is not less than the lower limit set forth above, the flexibility of an obtained electrode mixed material layer can be increased, and thus the peel strength of the electrode mixed material layer can be further increased. In particular, when the iodine value of the highly soluble polymer B1 is not less than the lower limit set forth above, the highly soluble polymer B1 can improve the dispersibility of various components in a slurry composition and can further increase the peel strength of an obtained electrode mixed material layer. Moreover, when the iodine value of the highly soluble polymer B1 is not more than any of the upper limits set forth above, the highly soluble polymer B1 can swell to a suitable degree in electrolyte solution, and rate characteristics of an obtained secondary battery can be further enhanced.

In addition to the iodine value range set forth above being satisfied, the proportional content of a nitrile group-containing monomer unit in the highly soluble polymer B1 is required to be 60.0 mass % or less. The proportional content of a nitrile group-containing monomer unit in the highly soluble polymer B1 is preferably 30.0 mass % or less. Note that the proportional content of a nitrile group-containing monomer unit in the highly soluble polymer B1 may be 0 mass % (i.e., the highly soluble polymer B1 may not include a nitrile group-containing monomer unit).

The highly soluble polymer B1 can have any chemical composition without any specific limitations so long as the iodine value range set forth above is satisfied and the upper limit for content of a nitrile group-containing monomer unit set forth above is satisfied. In particular, the highly soluble polymer B1 preferably includes a nitrile group-containing monomer unit, an aromatic vinyl monomer unit, an ethylenically unsaturated acid monomer unit, and a linear alkylene structural unit having a carbon number of 4 or more.

Examples of monomers that can be used to form the nitrile group-containing monomer unit include α,β-ethylenically unsaturated nitrile monomers. Specific examples of α,β-ethylenically unsaturated nitrile monomers include acrylonitrile; α-halogenoacrylonitriles such as α-chloroacrylonitrile and α-bromoacrylonitrile; and α-alkylacrylonitriles such as methacrylonitrile and α-ethylacrylonitrile. One of these α,β-ethylenically unsaturated nitrile monomers may be used individually, or two or more of these α,β-ethylenically unsaturated nitrile monomers may be used in combination. Of these α,β-ethylenically unsaturated nitrile monomers, acrylonitrile and methacrylonitrile are preferable from a viewpoint of increasing the binding capacity that can be displayed by the highly soluble polymer B1, with acrylonitrile being more preferable. One of these monomers may be used individually, or two or more of these monomers may be used in combination. The proportional content of the nitrile group-containing monomer unit in the highly soluble polymer B1 when all repeating units are taken to be 100 mass % is preferably 3 mass % or more, more preferably 6 mass % or more, and even more preferably 10 mass % or more, and is preferably 30 mass % or less, and more preferably 20 mass % or less.

Examples of monomers that can be used to form the aromatic vinyl monomer unit include aromatic vinyl monomers such as styrene, α-methylstyrene, butoxystyrene, vinyltoluene, and vinylnaphthalene. Note that the aromatic vinyl monomer does not include an acidic group. One of these aromatic vinyl monomers may be used individually, or two or more of these aromatic vinyl monomers may be used in combination. Of these aromatic vinyl monomers, styrene is preferable from a viewpoint of having good copolymerizability. The proportional content of the aromatic vinyl monomer unit in the highly soluble polymer B1 when all repeating units of the highly soluble polymer B1 (total of structural units and monomer units) are taken to be 100 mass % is preferably 30 mass % or more, and more preferably 50 mass % or more, and is preferably 65 mass % or less, and more preferably 60 mass % or less.

Examples of monomers that can be used to form the ethylenically unsaturated acid monomer unit include the same monomers as the various monomers listed in the "Ethylenically unsaturated acid monomer unit" section of "Particulate polymer A". Of these monomers, acrylic acid and methacrylic acid are preferable because they can efficiently trap transition metal ions that elute particularly from a positive electrode active material, and methacrylic acid is more preferable. The proportional content of the ethylenically unsaturated acid monomer unit in the highly soluble polymer B1 when all repeating units are taken to be 100 mass % is preferably 0.1 mass % or more, and is preferably 20 mass % or less, more preferably 10 mass % or less, and more preferably 5 mass % or less.

The linear alkylene structural unit having a carbon number of 4 or more (hereinafter, also referred to simply as an "alkylene structural unit") is a repeating unit that is composed of only a linear alkylene structure having a carbon number of 4 or more that is represented by a general formula: —$C_nH_{2n}$— (n is an integer of 4 or more). The method by which the linear alkylene structural unit having a carbon number of 4 or more is introduced into the highly soluble polymer B1 is not specifically limited and may be either of the following methods (1) or (2), for example.

(1) A method in which a polymer is produced from a monomer composition containing a conjugated diene monomer and then the polymer is hydrogenated to convert a conjugated diene monomer unit to a linear alkylene structural unit having a carbon number of 4 or more (2) A method in which a polymer is produced from a monomer composition containing a 1-olefin monomer having a carbon number of 4 or more such as 1-butene or 1-hexene The conjugated diene monomer or 1-olefin monomer may be one type used individually, or may be two or more types used in combination.

Of these methods, method (1) is preferable in terms of ease of production of the polymer.

Examples of conjugated diene monomers that can be used in method (1) include conjugated diene compounds having a carbon number of 4 or more such as 1,3-butadiene, isoprene, 2,3-dimethyl-1,3-butadiene, and 1,3-pentadiene. One of these conjugated diene monomers may be used individually, or two or more of these conjugated diene monomers may be used in combination. Of these conjugated diene monomers, 1,3-butadiene is preferable. In other words, the linear alkylene structural unit having a carbon number of 4 or more is preferably a structural unit obtained through hydrogenation of a conjugated diene monomer unit (i.e., the alkylene structural unit is preferably a hydrogenated conjugated diene unit), and is more preferably a structural unit obtained through hydrogenation of a 1,3-butadiene unit (i.e., the alkylene structural unit is more preferably a hydrogenated 1,3-butadiene unit). Selective hydrogenation of a conjugated diene monomer unit can be carried out by a commonly known method such as an oil-layer hydrogenation method or a water-layer hydrogenation method.

The highly soluble polymer B1 can be produced by, for example, polymerizing a monomer composition containing the monomers described above to obtain a copolymer, and then hydrogenating the obtained copolymer as necessary, but is not specifically limited to being produced in this manner.

The proportional content of the linear alkylene structural unit having a carbon number of 4 or more in the highly soluble polymer B1 when all repeating units are taken to be 100 mass % is preferably 15 mass % or more, and more preferably 20 mass % or more, and is preferably 50 mass % or less, more preferably 40 mass % or less, and even more preferably 30 mass % or less.

Note that in a case in which the linear alkylene structural unit having a carbon number of 4 or more that is included in the polymer B is formed by a method in which a polymer is produced from a monomer composition containing a conjugated diene monomer and then the polymer is hydrogenated, it is preferable that the total proportional content of the linear alkylene structural unit having a carbon number of 4 or more that is included in the polymer B and a conjugated diene monomer unit that remains in the polymer B without being hydrogenated satisfies any of the ranges set forth above.

[Highly Soluble Polymer B2]

The highly soluble polymer B2 is required to include a nitrile group-containing monomer unit in a proportion of not less than 70.0 mass % and not more than 98.0 mass % when all repeating units included in the highly soluble polymer B2 are taken to be 100 mass % as previously described. The highly soluble polymer B2 preferably includes the nitrile group-containing monomer unit in a proportion of 80.0 mass % or more, and preferably includes the nitrile group-containing monomer unit in a proportion of 98.0 mass % or less, and more preferably a proportion of 95.0 mass % or less. When the proportion in which the nitrile group-containing monomer unit is included in the highly soluble polymer B2 is not less than any of the lower limits set forth above, the highly soluble polymer B2 is readily adsorbed by an electrode active material in a situation in which a slurry composition is produced, and enables good thin-film coating of the electrode active material. This can enhance high-temperature storage characteristics of an obtained secondary battery. Moreover, when the proportion in which the nitrile group-containing monomer unit is included in the highly soluble polymer B2 is not more than any of the upper limits set forth above, excessive reduction of solubility of the highly soluble polymer B2 in the organic solvent can be inhibited, precipitation of the highly soluble polymer B2 in a slurry composition can be inhibited, and thus the solid content concentration of the slurry composition can be well increased. As a result, the slurry composition can contain an electrode active material, a conductive material, and the like in high concentrations, and rate characteristics of an obtained secondary battery can be enhanced.

Examples of nitrile group-containing monomers that can be used to form the nitrile group-containing monomer unit include the same monomers as the various monomers listed in the "Highly soluble polymer B1" section. One of these nitrile group-containing monomers may be used individually, or two or more of these nitrile group-containing monomers may be used in combination. Of these nitrile group-containing monomers, acrylonitrile and methacrylonitrile are preferable.

In addition to the nitrile group-containing monomer unit, the highly soluble polymer B2 may include other monomer units such as a basic group-containing monomer unit, an ethylenically unsaturated acid monomer unit, and a (meth) acrylic acid ester monomer unit.

The basic group-containing monomer unit can be formed using a basic group-containing monomer. Examples of basic group-containing monomers include, but are not specifically limited to, amino group-containing monomers such as dimethylaminoethyl (meth)acrylate, diethylaminoethyl (meth) acrylate, aminoethyl vinyl ether, and dimethylaminoethyl vinyl ether; and amide group-containing monomers such as N-vinylacetamide, (meth)acrylamide, N-methylol (meth) acrylamide, dimethyl (meth)acrylamide, diethyl (meth)acrylamide, N-methoxymethyl (meth)acrylamide, and dimethylaminopropyl (meth)acrylamide. The proportional content of the basic group-containing monomer unit in the highly soluble polymer B2 can, for example, be not less than 1 mass % and not more than 5 mass %, and preferably not less than 0.5 mass % and not more than 1.5 mass % when all repeating units are taken to be 100 mass %.

The ethylenically unsaturated acid monomer unit and the (meth)acrylic acid ester monomer unit can be formed using the same monomers as the various monomers listed in the "Ethylenically unsaturated acid monomer unit" section and the "(Meth)acrylic acid ester monomer unit" section of "Particulate polymer A". The proportional content of the ethylenically unsaturated acid monomer unit in the highly soluble polymer B2 can be 0.1 mass % or more and preferably 1 mass % or more, for example, and can be 10 mass % or less and preferably 5 mass % or less, for example, when all repeating units are taken to be 100 mass %. The proportional content of the (meth)acrylic acid ester monomer unit in the highly soluble polymer B2 can, for example, be not less than 1 mass % and not more than 20 mass %, and preferably 10 mass % or less when all repeating units are taken to be 100 mass %.

The highly soluble polymer B2 can be produced according to a known method such as described in the "Production method of particulate polymer A" section, for example, without any specific limitations.

As previously described, the presently disclosed binder composition preferably contains both of the highly soluble polymers B1 and B2. In such a case, the quantitative ratio of the highly soluble polymers B1 and B2 is preferably B1:B2=20:80 to 70:30, and more preferably B1:B2=30:70 to 60:40, by mass.

[Other Highly Soluble Polymer B3]

The other highly soluble polymer B3 may be any polymer without any specific limitations so long as it is judged to be "highly soluble" by the method described in the EXAMPLES section of the present specification. For example, a fluoropolymer such as polyvinylidene fluoride may be used as the other highly soluble polymer B3.

<Mixing Ratio of Particulate Polymer A and Highly Soluble Polymer B>

The mixing ratio of the particulate polymer A and the highly soluble polymer B is preferably A:B=5:95 to 50:50, more preferably A:B=5:95 to 45:55, even more preferably A:B=5:95 to 40:60, further preferably A:B=10:90 to 40:60, and particularly preferably A:B=20:80 to 40:60, by mass. When the amount of the particulate polymer A is not less than any of the lower limits set forth above, a sufficient amount of the particulate polymer A can be adsorbed by an electrode active material, and the peel strength of an obtained electrode mixed material layer can be further increased. Moreover, when the amount of the particulate polymer A is not more than any of the upper limits set forth above, excessive reduction of the amount of the highly soluble polymer B can be inhibited, and sedimentation of an electrode active material, a conductive material, and the like in a slurry composition used on a current collector and excessive reduction of close adherence between the current collector and an electrode mixed material layer can be inhibited. Moreover, by ensuring that the amount of the highly soluble polymer B is not excessively reduced, an electrode active material can be thin-film coated by the highly soluble polymer B, and high-temperature storage characteristics of a secondary battery can be enhanced.

<Proportion Constituted by Particulate Polymer A and Highly Soluble Polymer B1 Relative to Total>

The proportion constituted by the total amount of the particulate polymer A and the highly soluble polymer B1 relative to the total amount of the particulate polymer A and the highly soluble polymer B, which is expressed by (A+B1)/(A+B)×100 (mass %), is preferably 25 mass % or more, more preferably 30 mass % or more, and even more preferably 40 mass % or more from a viewpoint of further increasing the peel strength of an electrode mixed material layer. Note that although this proportion may be 100 mass % (i.e., the highly soluble polymer B contained in the binder composition may be composed of only the highly soluble polymer B1 having an iodine value of not less than 3 g/100 g and not more than 80 g/100 g), the proportion may alternatively be less than 100 mass %, and may, for example, be 90 mass % or less. In other words, the binder composition may contain a polymer that does not satisfy the iodine value range set forth above as the highly soluble polymer B. The previously described highly soluble polymer B2 including a nitrile group-containing monomer unit in a proportion of not less than 70.0 mass % and not more than 98.0 mass % is preferable as such a polymer. This is because the peel strength of an obtained electrode mixed material layer and rate characteristics of a secondary battery can be enhanced in an even better balance.

<Proportion Constituted by Particulate Polymer A and Highly Soluble Polymer B2 Relative to Total>

The proportion constituted by the total amount of the particulate polymer A and the highly soluble polymer B2 relative to the total amount of the particulate polymer A and the highly soluble polymer B, which is expressed by (A+B2)/(A+B)×100 (mass %), is preferably 25 mass % or more, more preferably 30 mass % or more, and even more preferably 40 mass % or more from a viewpoint of further enhancing high-temperature storage characteristics of an obtained secondary battery.

<Degree of Swelling in Electrolyte Solution of Mixture of Particulate Polymer A and Highly Soluble Polymer B>

The degree of swelling in electrolyte solution of the particulate polymer A and the highly soluble polymer B contained in the presently disclosed binder composition is preferably 150% or more, and more preferably 200% or more, and is preferably 500% or less, and more preferably 400% or less. When the degree of swelling in electrolyte solution of a mixture of the particulate polymer A and the highly soluble polymer B (i.e., of the binder) is not less than any of the lower limits set forth above, the flexibility of an obtained electrode can be increased. Moreover, when the degree of swelling in electrolyte solution of the binder is not more than any of the upper limits set forth above, it is possible to inhibit an increase of internal resistance of a secondary battery and deterioration of rate characteristics of the secondary battery caused by excessive swelling of an obtained electrode in electrolyte solution. Therefore, flexibility of an electrode and rate characteristics of a secondary battery can be achieved in a good balance when the degree of swelling in electrolyte solution of the binder is within any of the ranges set forth above.

Note that the degree of swelling in electrolyte solution of the binder can be adjusted as appropriate depending on the mixing proportions and chemical compositions of the particulate polymer A and the highly soluble polymer B, the volume-average particle diameter of the particulate polymer A, and so forth. For example, the degree of swelling in electrolyte solution can be increased in a case in which the proportion of the particulate polymer A is high. Moreover, the degree of swelling in electrolyte solution can be increased in a case in which the volume-average particle diameter of the particulate polymer A is small, for example.

<Other Binders>

Besides the particulate polymer A and the highly soluble polymer B set forth above, the presently disclosed binder composition may contain other binders differing from the particulate polymer A and the highly soluble polymer B. Examples of such binders include polyvinyl acetate-based binders, polyacrylic acid-based binders, and polyvinyl alcohol-based binders. In a case in which the presently disclosed binder composition contains another binder, the proportional content of the other binder when the mass of all binders contained in the binder composition is taken to be 100 mass % is preferably less than 50 mass %, more preferably 40 mass % or less, even more preferably 30 mass % or less, and may be 0 mass % (i.e., the presently disclosed binder composition may contain only the particulate polymer A and the highly soluble polymer B set forth above as binders).

<Organic Solvent>

Examples of the organic solvent of the presently disclosed binder composition include alcohols such as methanol, ethanol, n-propanol, isopropanol, n-butanol, isobutanol, t-butanol, pentanol, hexanol, heptanol, octanol, nonanol, decanol, and amyl alcohol, ketones such as acetone, methyl ethyl ketone, and cyclohexanone, esters such as ethyl acetate and butyl acetate, ethers such as diethyl ether, dioxane, and tetrahydrofuran, amide polar organic solvents such as N,N-dimethylformamide and N-methyl-2-pyrrolidone (NMP), and aromatic hydrocarbons such as toluene, xylene, chlorobenzene, ortho-dichlorobenzene, and para-dichlorobenzene. One of these organic solvents may be used individually, or two or more of these organic solvents may be used as a mixture. Of these examples, NMP is preferable as the organic solvent.

<Other Components>

Other than the components set forth above, the presently disclosed binder composition may contain components such as a reinforcing material, a leveling agent, a viscosity modifier, and an additive for electrolyte solution. These other components are not specifically limited so long as they do not affect battery reactions and may be selected from commonly known components such as those described in WO2012/115096A1. One of these components may be used individually, or two or more of these components may be used in combination in a freely selected ratio.

<Production of Binder Composition>

The presently disclosed binder composition can be produced by mixing the above-described particulate polymer A and highly soluble polymer B as the binder, the organic solvent, and the other optional components by a known method. Specifically, the binder composition can be produced by mixing the above-described components using a mixer such as a ball mill, a sand mill, a bead mill, a pigment disperser, a grinding machine, an ultrasonic disperser, a homogenizer, a planetary mixer, or a FILMIX. Although no specific limitations are placed on the solid content concentration of the binder composition, the solid content concentration can be not less than 5 mass % and not more than 60 mass %, for example.

Note that the quantitative ratio of the particulate polymers A1 and A2 used as the particulate polymer A in production of the presently disclosed binder composition is preferably A1:A2=20:80 to 80:20, and more preferably A1:A2=40:60 to 60:40, by mass.

(Slurry Composition for Non-Aqueous Secondary Battery Electrode)

The presently disclosed slurry composition for a non-aqueous secondary battery electrode contains an electrode active material and the binder composition set forth above, and optionally further contains other components. In other words, the presently disclosed slurry composition contains an electrode active material and the previously described particulate polymer A, highly soluble polymer B, and organic solvent, and optionally further contains other components. As a result of the presently disclosed slurry composition containing the binder composition set forth above, the presently disclosed slurry composition can form an electrode mixed material layer having high peel strength. Therefore, a secondary battery can be caused to display excellent battery characteristics through the presently disclosed slurry composition.

Although the following describes, as one example, a case in which the slurry composition for a secondary battery electrode is a slurry composition for a lithium ion secondary battery positive electrode, the presently disclosed slurry composition for a secondary battery electrode is not limited to the following example.

<Electrode Active Material>

The electrode active material is a material that gives and receives electrons in an electrode of a secondary battery. A material that can occlude and release lithium is normally used as a positive electrode active material for a lithium ion secondary battery.

Specific examples of positive electrode active materials for lithium ion secondary batteries include, without any specific limitations, known positive electrode active materials such as lithium-containing cobalt oxide ($LiCoO_2$), lithium manganate ($LiMn_2O_4$), lithium-containing nickel oxide ($LiNiO_2$), a lithium-containing complex oxide of Co—Ni—Mn ($Li(Co,Mn,Ni)O_2$), a lithium-containing complex oxide of Ni—Mn—Al, a lithium-containing complex oxide of Ni—Co—Al, olivine-type lithium iron phosphate ($LiFePO_4$), olivine-type lithium manganese phosphate ($LiMnPO_4$), a $Li_2MnO_3$—$LiNiO_2$-based solid solution, lithium-rich spinel compounds represented by $Li_{1+x}Mn_{2-x}O_4$ (0<x<2), $Li[Ni_{0.17}Li_{0.2}Co_{0.7}Mn_{0.56}]O_2$, and $LiNi_{0.5}Mn_{1.5}O_4$.

The particle diameter of the positive electrode active material is not specifically limited and may be the same as that of a conventionally used positive electrode active material. The proportional content of the positive electrode active material in the slurry composition can be not less than 90 mass % and not more than 99 mass %, for example, when all solid content in the slurry composition is taken to be 100 mass %.

<Conductive Material>

A conductive material is a component that ensures electrical contact amongst the electrode active material. Examples of conductive materials that can be used include conductive carbon materials such as carbon black (for example, acetylene black, Ketjenblack® (Ketjenblack is a registered trademark in Japan, other countries, or both), and furnace black), single-walled or multi-walled carbon nanotubes (multi-walled carbon nanotubes are inclusive of cup-stacked carbon nanotubes), carbon nanohorns, vapor grown carbon fiber, milled carbon fiber obtained by pyrolyzing and then pulverizing polymer fiber, single layer or multilayer graphene, and carbon nonwoven fabric sheet obtained through pyrolysis of nonwoven fabric made from polymer fiber; and fibers and foils of various metals.

One of these conductive materials may be used individually, or two or more of these conductive materials may be used in combination. The particle diameter of the conductive material is not specifically limited and may be the same as that of a conventionally used conductive material. The proportional content of the conductive material in the slurry composition can be not less than 0.1 mass % and not more than 3 mass %, for example, when all solid content in the slurry composition is taken to be 100 mass %.

<Binder Composition>

The presently disclosed binder composition for a non-aqueous secondary battery electrode set forth above is used as the binder composition. Note that the proportional content of the binder composition in the slurry composition can be not less than 0.1 mass % and not more than 5 mass %, for example, when all solid content in the slurry composition is taken to be 100 mass %.

<Other Components>

Examples of other components that may be contained in the slurry composition include, but are not specifically limited to, the same other components as may be contained in the presently disclosed binder composition. One other component may be used individually, or two or more other components may be used in combination in a freely selected ratio.

<Production of Slurry Composition>

The slurry composition set forth above can be produced by mixing the particulate polymer A (particulate polymers A1 and A2) and the highly soluble polymer B as the binder, the organic solvent, and the other optional components by a known method. Specifically, the slurry composition can be produced by mixing the above-described components and the organic solvent using a mixer such as a ball mill, a sand mill, a bead mill, a pigment disperser, a grinding machine, an ultrasonic disperser, a homogenizer, a planetary mixer, or a FILMIX. Examples of organic solvents that can be used in production of the slurry composition include the same organic solvents as can be used in the presently disclosed binder composition. Moreover, the organic solvent contained in the binder composition may serve as the organic solvent used in production of the slurry composition.

(Electrode for Non-Aqueous Secondary Battery)

The presently disclosed electrode for a non-aqueous secondary battery includes a current collector and an electrode mixed material layer formed on the current collector. The electrode mixed material layer is formed using the slurry composition set forth above. In other words, the electrode mixed material layer contains at least an electrode active material, a polymer derived from the particulate polymer A, and a polymer derived from the highly soluble polymer B, and optionally contains other components. It should be noted that components contained in the electrode mixed material layer are components that are contained in the previously described slurry composition. Furthermore, the preferred ratio of these components in the electrode mixed material layer is the same as the preferred ratio of these components in the slurry composition. Also note that the "polymer derived from the particulate polymer A" may maintain a particulate form in the electrode mixed material layer or may have another form without maintaining a particulate form. Moreover, the polymer derived from the highly soluble polymer B is preferably present covering at least part of the surface of a solid component such as the electrode active material.

The presently disclosed electrode for a non-aqueous secondary battery has high peel strength as a result of being formed using a slurry composition that contains the presently disclosed binder composition. Consequently, a secondary battery having excellent battery characteristics such as rate characteristics and high-temperature storage characteristics is obtained by using this electrode.

<Production Method of Electrode>

The presently disclosed electrode for a non-aqueous secondary battery can be produced, for example, through a step of applying the above-described slurry composition onto the current collector (application step) and a step of drying the slurry composition that has been applied onto the current collector to form an electrode mixed material layer on the current collector (drying step).

[Application Step]

The slurry composition can be applied onto the current collector by any commonly known method without any specific limitations. Specific examples of application methods that can be used include doctor blading, dip coating, reverse roll coating, direct roll coating, gravure coating, extrusion coating, and brush coating. During application, the slurry composition may be applied onto one side or both sides of the current collector. The thickness of the slurry coating on the current collector after application but before drying may be set as appropriate in accordance with the thickness of the electrode mixed material layer to be obtained after drying.

The current collector onto which the slurry composition is applied is a material having electrical conductivity and electrochemical durability. Specifically, the current collector may, for example, be made of iron, copper, aluminum, nickel, stainless steel, titanium, tantalum, gold, platinum, or the like. One of these materials may be used individually, or two or more of these materials may be used in combination in a freely selected ratio.

[Drying Step]

The slurry composition on the current collector may be dried by any commonly known method without any specific limitations. Examples of drying methods that can be used include drying by warm, hot, or low-humidity air; drying in a vacuum; and drying by irradiation with infrared light, electron beams, or the like. Through drying of the slurry composition on the current collector in this manner, an electrode mixed material layer can be formed on the current collector to thereby obtain an electrode for a secondary battery that includes the current collector and the electrode mixed material layer.

After the drying step, the electrode mixed material layer may be further subjected to a pressing process, such as mold pressing or roll pressing. The pressing process can improve close adherence between the electrode mixed material layer and the current collector. Furthermore, in a case in which the electrode mixed material layer contains a curable polymer, the polymer is preferably cured after the electrode mixed material layer has been formed.

As a result of the presently disclosed slurry composition containing the two particulate polymers A1 and A2 having different volume-average particle diameters as the particulate polymer A, the formation of unnecessary voids in the electrode mixed material layer can be inhibited, and the electrode mixed material layer can be easily densified. Therefore, battery characteristics (particularly rate characteristics) of a secondary battery can be efficiently improved by using the presently disclosed slurry composition for a secondary battery electrode.

(Non-Aqueous Secondary Battery)

The presently disclosed non-aqueous secondary battery includes the presently disclosed electrode for a non-aqueous secondary battery. More specifically, the presently disclosed non-aqueous secondary battery includes a positive electrode, a negative electrode, an electrolyte solution, and a separator, and has the presently disclosed electrode for a non-aqueous secondary battery as at least one of the positive electrode and the negative electrode. The presently disclosed non-aqueous secondary battery has excellent battery characteristics such as rate characteristics and high-temperature storage characteristics as a result of including the presently disclosed electrode for a non-aqueous secondary battery.

Note that it is preferable that the presently disclosed non-aqueous secondary battery is a non-aqueous secondary battery having the presently disclosed electrode for a non-aqueous secondary battery as a positive electrode. Although the following describes, as one example, a case in which the secondary battery is a lithium ion secondary battery, the presently disclosed secondary battery is not limited to the following example.

<Electrodes>

Examples of electrodes other than the electrode for a non-aqueous secondary battery set forth above that can be used in the presently disclosed non-aqueous secondary battery include known electrodes used in production of non-aqueous secondary batteries without any specific limitations. Specifically, an electrode obtained by forming an electrode mixed material layer on a current collector by a known production method may be used as an electrode other than the electrode for a non-aqueous secondary battery set forth above.

<Electrolyte Solution>

The electrolyte solution is normally an organic electrolyte solution obtained by dissolving a supporting electrolyte in an organic solvent. The supporting electrolyte of the lithium ion secondary battery may, for example, be a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable because they readily dissolve in solvents and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of suitable organic solvents include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferred for their high dielectric constant and broad stable potential region, and a mixture of ethylene carbonate and diethyl carbonate is more preferable.

The concentration of the electrolyte in the electrolyte solution may be adjusted as appropriate. Moreover, known additives such as vinylene carbonate may be added to the electrolyte solution.

<Separator>

The separator may be a separator such as described in JP2012-204303A, for example, but is not specifically limited thereto. Of these separators, a microporous membrane made of polyolefinic (polyethylene, polypropylene, polybutene, or polyvinyl chloride) resin is preferred since such a membrane can reduce the total thickness of the separator, which increases the proportion of electrode active material in the secondary battery, and consequently increases the volumetric capacity of the secondary battery.

<Production Method of Non-Aqueous Secondary Battery>

The presently disclosed non-aqueous secondary battery can be produced by, for example, stacking the positive electrode and the negative electrode with the separator in-between, performing rolling, folding, or the like of the resultant laminate as necessary in accordance with the battery shape, placing the laminate in a battery container, injecting the electrolyte solution into the battery container, and sealing the battery container. In order to prevent pressure increase inside the secondary battery and occurrence of overcharging or overdischarging, an overcurrent preventing device such as a PTC device or a fuse; an expanded metal; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer.

In the examples and comparative examples, the volume-average particle diameter of a particulate polymer A, the degree of swelling in electrolyte solution of a mixture of a particulate polymer A and a highly soluble polymer B, the iodine value of a highly soluble polymer B, and the NMP solubility of a particulate polymer A and a highly soluble polymer B were measured or confirmed as described below. In addition, electrode flexibility, peel strength, and rate characteristics and high-temperature storage characteristics of a secondary battery in the examples and comparative examples were evaluated as described below.

<Volume-Average Particle Diameter of Particulate Polymer A>

A particle diameter distribution (by volume) was obtained by laser diffraction/scattering in accordance with JIS Z8828 for each NMP dispersion (solid content concentration: 8%) of a particulate polymer A (particulate polymers A1 and A2) obtained in the examples and comparative examples. The particle diameter (D50) at which cumulative volume calculated from the small diameter end of the obtained particle diameter distribution reached 50% was taken to be the volume-average particle diameter of the particulate polymer A.

<Degree of Swelling in Electrolyte Solution of Particulate Polymer A and Highly Soluble Polymer B>

An NMP dispersion in which a particulate polymer A and a highly soluble polymer B produced in each of the examples and comparative examples were contained in the mixing ratio described in the example was used to form a film of 2±0.5 mm in thickness and was dried by a 120° C. vacuum dryer for 10 hours. The film was subsequently cut up and approximately 1 g thereof was precisely weighed. The mass of a film piece obtained in this manner was taken to be W0. The film piece was immersed in an electrolyte solution (chemical composition: $LiPF_6$ solution of 1.0 M in concentration (solvent: mixed solvent of ethylene carbonate (EC)/diethyl carbonate (DEC)=3/7 (volume ratio); additive: 2 volume % (solvent ratio) of vinylene carbonate)) for 3 days in an environment having a temperature of 60° C. and was allowed to swell. Thereafter, the film piece was pulled out of the electrolyte solution and the mass thereof was measured after electrolyte solution on the surface of the film piece had been gently wiped off. The mass of the swollen film piece was taken to be W1.

The degree of swelling in electrolyte solution was calculated using the following calculation formula.

Degree of swelling in electrolyte solution
(mass %)={(W1−W0)/W0}×100

<Iodine Value of Highly Soluble Polymer B>

For each water dispersion of a highly soluble polymer B (water dispersion before solvent replacement with NMP) produced in the examples and comparative examples, 100 g thereof was coagulated in 1 L of methanol and was then vacuum dried at a temperature of 60° C. for 12 hours. The iodine value of the dry highly soluble polymer B that was obtained was then measured in accordance with JIS K6235 (2006).

<NMP Solubility of Particulate Polymer A>

Each particulate polymer A produced in the examples and comparative examples was vacuum dried in a 25° C. environment for 24 hours to obtain a dry polymer (mass: W1 g). The obtained dry polymer was left in 60° C. NMP for 72 hours, and then insoluble content was separated by filtration through 200 mesh. The insoluble content was washed with methanol and was then dried in a 25° C. environment for 24 hours to obtain dry insoluble content (mass: W2 g). The amount of NMP-insoluble content in the particulate polymer A (=W2/W1×100 (mass %)) was calculated from W1 and W2. Note that the amount of NMP-insoluble content was confirmed to be 70 mass % or more for every particulate polymer A produced in the examples and comparative examples.

<NMP Solubility of Highly Soluble Polymer B>

A composition containing a highly soluble polymer B in N-methyl-2-pyrrolidone (NMP) that was produced in each of the examples and comparative examples was added dropwise, in an amount of 25 g, to 1 L of methanol so as to cause precipitation of the highly soluble polymer B. The precipitated highly soluble polymer B was vacuum dried in a 25° C. environment for 24 hours to obtain a dry polymer (mass: W1 g). The obtained dry polymer was left in 60° C. NMP for 72 hours, and then insoluble content was separated by filtration through 200 mesh. The insoluble content was washed with methanol and was then dried in a 25° C. environment for 24 hours to obtain dry insoluble content (mass: W2 g). The amount of NMP-insoluble content in the highly soluble polymer B (=W2/W1×100 (mass %)) was calculated from W1 and W2. Note that the amount of NMP-insoluble content was confirmed to be 50 mass % or less for every highly soluble polymer B produced in the examples and comparative examples.

<Electrode Flexibility>

A rod was placed at a positive electrode mixed material layer side of a positive electrode for a lithium ion secondary battery produced in each of the examples and comparative examples, the positive electrode was wound around the rod, and the occurrence of cracking of the positive electrode mixed material layer was evaluated. This was performed using rods having different diameters. When the positive electrode can be wound around a rod with a smaller diameter without cracking of the positive electrode mixed material layer, this indicates that the positive electrode has better flexibility and winding properties. The flexibility of the electrode (positive electrode) was evaluated by the following standard according to the diameter of a thinnest rod with which cracking of the positive electrode mixed material layer did not occur.

A: Cracking does not occur upon winding around rod of 1.15 mm in diameter

B: Cracking does not occur upon winding around rod of 1.40 mm in diameter

C: Cracking does not occur upon winding around rod of 2.00 mm in diameter

D: Cracking does not occur upon winding around rod of 3.00 mm in diameter

<Peel Strength of Electrode Mixed Material Layer>

A positive electrode for a lithium ion secondary battery produced in each of the examples and comparative examples was cut out as a rectangle of 100 mm in length and 10 mm in width to obtain a test specimen. The test specimen was placed with the surface at which the positive electrode mixed material layer was located facing downward, cellophane tape (tape in accordance with JIS Z1522) was affixed to the surface of the positive electrode mixed material layer, and the stress was measured when the current collector was peeled off by pulling one end of the current collector in a perpendicular direction at a speed of 100 mm/min. (Note that the cellophane tape was secured to a test stage.) This measurement was performed three times to obtain an average value. The average value was taken to be the peel strength and was evaluated by the following standard. A larger value for the peel strength indicates stronger close adherence between the positive electrode mixed material layer and the current collector and higher peel strength of the electrode (positive electrode) mixed material layer.

A: Peel strength of 30 N/m or more
B: Peel strength of not less than 25 N/m and less than 30 N/m
C: Peel strength of not less than 20 N/m and less than 25 N/m
D: Peel strength of less than 20 N/m <Rate Characteristics of Secondary Battery>

A lithium ion secondary battery produced in each of the examples and comparative examples was left at rest at a temperature of 25° C. for 5 hours after injection of electrolyte solution. Next, the lithium ion secondary battery was charged to a cell voltage of 3.65 V by a 0.2 C constant-current method at a temperature of 25° C. and was then subjected to 12 hours of aging at a temperature of 60° C. The lithium ion secondary battery was then discharged to a cell voltage of 3.00 V by a 0.2 C constant-current method at a temperature of 25° C. Thereafter, CC-CV charging of the lithium ion secondary battery was performed with a 0.2 C constant current (upper limit cell voltage: 4.20 V) and CC discharging of the lithium ion secondary battery was performed to a cell voltage of 3.00 V with a 0.2 C constant current. This charging and discharging at 0.2 C was repeated three times.

Next, 0.2 C constant-current charging and discharging of the lithium ion secondary battery was performed between cell voltages of 4.20 V and 3.00 V in an environment having a temperature of 25° C., and the discharge capacity at this time was defined as C0. Thereafter, the lithium ion secondary battery was CC-CV charged with a 0.2 C constant current in the same manner, was subsequently CC discharged to 3.00 V with a 2.0 C constant current in an environment having a temperature of 25° C., and the discharge capacity at this time was defined as C1. The discharge capacity (C1) at 2.0 C as a proportion (percentage; capacity maintenance rate) relative to the discharge capacity (C0) at 0.2 C, which is expressed by (C1/C0)×100(%), was calculated as a rate characteristic and was evaluated by the following standard. A larger value for the capacity maintenance rate indicates less reduction of discharge capacity at high-current and lower internal resistance (i.e., better rate characteristics).

A: Capacity maintenance rate of 75% or more
B: Capacity maintenance rate of not less than 73% and less than 75%
C: Capacity maintenance rate of not less than 70% and less than 73%
D: Capacity maintenance rate of less than 70%

<High-Temperature Storage Characteristics>

A lithium ion secondary battery produced in each of the examples and comparative examples was left at rest at a temperature of 25° C. for 5 hours after injection of electrolyte solution. Next, the lithium ion secondary battery was charged to a cell voltage of 3.65 V by a 0.2 C constant-current method at a temperature of 25° C. and was then subjected to 12 hours of aging at a temperature of 60° C. The lithium ion secondary battery was then discharged to a cell voltage of 3.00 V by a 0.2 C constant-current method at a temperature of 25° C. Thereafter, CC-CV charging of the lithium ion secondary battery was performed with a 0.2 C constant current (upper limit cell voltage: 4.20 V) and CC discharging of the lithium ion secondary battery was performed to a cell voltage of 3.00 V with a 0.2 C constant current. This charging and discharging at 0.2 C was repeated three times. The discharge capacity of the third repetition at 0.2 C was taken to be the initial capacity Cx. Thereafter, CC-CV charging of the lithium ion secondary battery was performed with a 0.2 C constant current (upper limit cell voltage: 4.20 V). Next, the lithium ion secondary battery was stored for 4 weeks in an inert oven with the inside of a treatment chamber set to a nitrogen atmosphere of 60° C. After storage, the lithium ion secondary battery was discharged to a cell voltage of 3.00 V by a 0.2 C constant-current method, and the discharge capacity at this time was taken to be Cy.

A high-temperature capacity maintenance rate expressed by (Cy/Cx)×100(%) was calculated and was evaluated by the following standard. A larger value for the high-temperature capacity maintenance rate indicates less degradation of the battery during high-temperature storage (i.e., better high-temperature storage characteristics).

A: High-temperature capacity maintenance rate of 80% or more
B: High-temperature capacity maintenance rate of not less than 75% and less than 80%
C: High-temperature capacity maintenance rate of not less than 70% and less than 75%
D: High-temperature capacity maintenance rate of less than 70%

Example 1

<Production of Particulate Polymer A1>

A 1 L septum-equipped flask that included a stirrer was charged with 100 parts of deionized water, the gas phase was purged with nitrogen gas, and heating was performed to 80° C. Thereafter, 0.3 parts of ammonium persulfate (APS) as a polymerization initiator was dissolved in 5.7 parts of deionized water and was added into the flask.

Meanwhile, a monomer composition was obtained in a separate vessel by mixing 40 parts of deionized water, 0.18 parts of sodium polyoxyethylene alkyl ether sulfate (LATEMUL E-118B produced by Kao Corporation) as an emulsifier, 39.1 parts of n-butyl acrylate (BA) and 55.1 parts of methyl methacrylate (MMA) as (meth)acrylic acid ester monomers, 5.0 parts of methacrylic acid (MAA) as an ethylenically unsaturated acid monomer, and 0.8 parts of allyl methacrylate (AMA) as a cross-linkable monomer. The monomer composition was continuously added to the 1 L septum-equipped flask over 1 hour to carry out polymerization. The reaction was carried out at 80° C. during this addition. After completion of this addition, further stirring was performed at 80° C. for 1 hour to complete the reaction.

Next, a suitable amount of NMP was added to the resultant water dispersion containing a particulate polymer A1 to obtain a mixture. Thereafter, vacuum distillation was performed at 90° C. to remove water and excess NMP from the mixture and thereby obtain an NMP dispersion (solid content concentration: 8%) of the particulate polymer A1.

It was confirmed that a particulate polymer was dispersed in the dispersion medium (NMP) by drying the obtained NMP dispersion of the polymer A at 120° C. for 1 hour to prepare a film of 0.2 mm to 0.5 mm in thickness, and then confirming that the particulate polymer A maintained a particulate form using a scanning electron microscope (SEM).

The volume-average particle diameter $D50_{A1}$ of the obtained particulate polymer A1 was measured by the previously described method. The result is shown in Table 1.

<Production of Particulate Polymer A2>

Operations were performed in the same manner as in production of the particulate polymer A1 with the exception that the amount of the emulsifier that was charged to the vessel in production of the monomer composition was changed to 0.50 parts so as to obtain a water dispersion of a particulate polymer A2 and an NMP dispersion (solid content concentration: 8%) of the particulate polymer A2 in which the solvent of the water dispersion had been replaced with NMP. It was confirmed that a particulate polymer was dispersed in the dispersion medium (NMP) through SEM observation of the NMP dispersion.

The volume-average particle diameter $D50_{A2}$ of the obtained particulate polymer A2 was measured by the previously described method. The result is shown in Table 1.

<Production of Highly Soluble Polymer B1-1-1>

An autoclave equipped with a stirrer was charged with 240 parts of deionized water, 2.5 parts of sodium alkylbenzene sulfonate as an emulsifier, 11 parts of acrylonitrile as a nitrile group-containing monomer, 57 parts of styrene as an aromatic vinyl monomer, and 3 parts of methacrylic acid as an ethylenically unsaturated acid monomer in this order. The inside of the autoclave was purged with nitrogen, 29 parts of 1,3-butadiene as a conjugated diene monomer was subsequently injected, and 0.25 parts of ammonium persulfate as a polymerization initiator was added to carry out a polymerization reaction at a reaction temperature of 40° C. and thereby obtain a copolymer including nitrile group-containing monomer units, aromatic vinyl monomer units, ethylenically unsaturated acid monomer units, and conjugated diene monomer units. The iodine value of the obtained copolymer (pre-hydrogenation polymer) measured as previously described was 140 g/100 g. The polymerization conversion rate was 85%.

Deionized water was added to the pre-hydrogenation polymer to obtain 400 mL of a solution (total solid content: 48 g) that had been adjusted to a total solid content concentration of 12 mass %. This solution was loaded into an autoclave of 1 L in capacity that was equipped with a stirrer, and dissolved oxygen in the solution was removed by passing nitrogen gas for 10 minutes. Thereafter, 50 mg of palladium acetate as a hydrogenation reaction catalyst was dissolved in 180 mL of deionized water to which nitric acid had been added in an amount of 4 molar equivalents relative to the palladium (Pd), and the resultant solution was added into the autoclave. After purging the system twice with hydrogen gas, the contents of the autoclave were heated to 50° C. in a state in which the hydrogen gas pressure was raised to a gauge pressure of 3 MPa, and a hydrogenation reaction (first stage hydrogenation reaction) was carried out for 6 hours. The iodine value of the polymer that had undergone the first stage hydrogenation reaction measured as previously described was 35 g/100 g.

Next, the inside of the autoclave was restored to atmospheric pressure, 25 mg of palladium acetate as a hydrogenation reaction catalyst was dissolved in 60 mL of water to which nitric acid had been added in an amount of 4 molar equivalents relative to the Pd, and the resultant solution was added into the autoclave. After purging the system twice with hydrogen gas, the contents of the autoclave were heated to 50° C. in a state in which the hydrogen gas pressure was raised to a gauge pressure of 3 MPa, and a hydrogenation reaction (second stage hydrogenation reaction) was carried out for 6 hours.

Next, the contents of the autoclave were restored to normal temperature, the system was converted to a nitrogen atmosphere, and an evaporator was used to concentrate the contents to a solid content concentration of 40% to obtain a water dispersion of a highly soluble polymer B1-1-1 as a highly soluble polymer B1.

After adding 320 parts of N-methylpyrrolidone (hereinafter, referred to as "NMP") as a solvent to 100 parts of the obtained water dispersion of the highly soluble polymer B1-1-1 obtained as described above, water was vacuum evaporated to obtain an NMP dispersion of the highly soluble polymer B1-1-1.

The iodine value of the highly soluble polymer B1-1-1 was measured by the previously described method. The result is shown in Table 1.

<Production of Slurry Composition for Secondary Battery Positive Electrode>

After adding 97 parts of an active material NMC532 based on a lithium complex oxide of Co—Ni—Mn ($LiNi_{5/10}Co_{2/10}Mn_{3/10}O_2$) as a positive electrode active material, 2 parts of acetylene black (produced by Denka Company Limited; product name: Denka black) as a conductive material, and 1 part (in terms of solid content), in total, of the particulate polymer A and the highly soluble polymer B as a binder into a planetary mixer and mixing these materials, NMP was gradually added as an organic solvent and was mixed therewith by stirring at a temperature of 25±3° C. and a rotation speed of 60 rpm to adjust the viscosity to 4,000 mPa·s as measured using a B-type viscometer at 60 rpm (M4 rotor) and 25±3° C. The makeup of the binder was 0.15 parts of the particulate polymer A1, 0.15 parts of the particulate polymer A2, and 0.7 parts of the highly soluble polymer B1-1-1, in terms of solid content, and the mixing ratio of the particulate polymer A and the highly soluble polymer B was 30:70, by mass.

<Production of Positive Electrode>

The slurry composition for a positive electrode obtained as described above was applied onto aluminum foil of 20 μm in thickness serving as a current collector by a comma coater such as to have a coating weight of 20±0.5 mg/cm².

The slurry composition on the aluminum foil was dried by conveying the aluminum foil inside a 100° C. oven for 2 minutes and a 130° C. oven for 2 minutes at a speed of 200 mm/min to obtain a positive electrode web including a positive electrode mixed material layer formed on the current collector.

Thereafter, the positive electrode mixed material layer side of the produced positive electrode web was roll pressed with a line pressure of 14 t (tons) in an environment having a temperature of 25±3° C. to obtain a positive electrode having a positive electrode mixed material layer density of 3.50 g/cm³. Electrode flexibility and peel strength were evaluated with respect to the obtained positive electrode by the previously described methods. The results are shown in Table 1.

<Production of Binder Composition for Negative Electrode>

A 5 MPa pressure vessel equipped with a stirrer was charged with 65 parts of styrene, 35 parts of 1,3-butadiene, 2 parts of itaconic acid, 1 part of 2-hydroxyethyl acrylate, 0.3 parts of t-dodecyl mercaptan as a molecular weight modifier, 5 parts of sodium dodecylbenzenesulfonate as an emulsifier, 150 parts of deionized water, and 1 part of potassium persulfate as a polymerization initiator. These materials were sufficiently stirred and were then heated to a temperature of 55° C. to initiate polymerization. The reaction was quenched by cooling at the point at which monomer consumption reached 95.0%. A water dispersion containing a polymer that was obtained in this manner was adjusted to pH 8 through addition of 5% sodium hydroxide aqueous solution. Unreacted monomer was subsequently removed through thermal-vacuum distillation. Thereafter, cooling was performed to a temperature of 30° C. or lower to yield a water dispersion containing a binder for a negative electrode.

<Production of Slurry Composition for Negative Electrode>

A planetary mixer was charged with 48.75 parts of artificial graphite (theoretical capacity: 360 mAh/g) and 48.75 parts of natural graphite (theoretical capacity: 360 mAh/g) as negative electrode active materials, and 1 part in terms of solid content of carboxymethyl cellulose as a thickener. These materials were diluted to a solid content concentration of 60% with deionized water and were subsequently kneaded at a rotation speed of 45 rpm for 60 minutes. Thereafter, 1.5 parts in terms of solid content of the binder composition for a negative electrode obtained as described above was added and was kneaded therewith at a rotation speed of 40 rpm for 40 minutes. Deionized water was then added to adjust the viscosity to 3,000±500 mPa·s (measured by a B-type viscometer at 25° C. and 60 rpm) and thereby produce a slurry composition for a negative electrode.

<Production of Negative Electrode>

The slurry composition for a negative electrode was applied onto the surface of copper foil of 15 μm in thickness serving as a current collector by a comma coater such as to have a coating weight of 11±0.5 mg/cm². The copper foil with the slurry composition for a negative electrode applied thereon was subsequently conveyed inside an 80° C. oven for 2 minutes and a 110° C. oven for 2 minutes at a speed 400 mm/min to dry the slurry composition on the copper foil and obtain a negative electrode web including a negative electrode mixed material layer formed on the current collector.

Thereafter, the negative electrode mixed material layer side of the produced negative electrode web was roll pressed with a line pressure of 11 t (tons) in an environment having a temperature of 25±3° C. to obtain a negative electrode having a negative electrode mixed material layer density of 1.60 g/cm³.

<Preparation of Separator for Secondary Battery>

A separator made from a single layer of polypropylene (#2500 produced by Celgard, LLC.) was used.

<Production of Non-Aqueous Secondary Battery>

A single-layer laminated cell (initial design discharge capacity: equivalent to 40 mAh) was produced using the negative electrode, positive electrode, and separator described above and was arranged inside aluminum packing. The aluminum packing was subsequently filled with a LiPF$_6$ solution of 1.0 M in concentration (solvent: mixed solvent of ethylene carbonate (EC)/diethyl carbonate (DEC)=3/7 (volume ratio); additive: containing 2 volume % (solvent ratio) of vinylene carbonate) as an electrolyte solution. The aluminum packing was then closed by heat sealing at a temperature of 150° C. to tightly seal an opening of the aluminum packing, and thereby produce a lithium ion secondary battery.

The lithium ion secondary battery was used to evaluate rate characteristics and high-temperature storage characteristics as previously described. The results are shown in Table 1.

Examples 2 and 3

Various operations, measurements, and evaluations were performed in the same way as in Example 1 with the exception that the amounts of emulsifier added in production of the particulate polymers A1 and A2 were changed such as to obtain particulate polymers satisfying the volume-average particle diameters shown in Table 1. The results are shown in Table 1.

Example 4

A highly soluble polymer B1-1-2 was produced by performing operations in the same way as in production of the highly soluble polymer B1-1-1 in Example 1 with the exception of some conditions. In order to produce the highly soluble polymer B1-1-2, the conditions of the first stage and second stage hydrogenation reactions were changed such that the iodine value was a value shown in Table 1. Moreover, the mixing ratio of the particulate polymer A and the highly soluble polymer B1-1-2 as the highly soluble polymer B in production of the slurry composition for a secondary battery positive electrode was set as 10:90, by mass. Note that the quantitative ratio of the particulate polymer A1 and the particulate polymer A2 was 50:50, by mass. With the exception of these points, various operations, measurements, and evaluations were performed in the same way as in Example 1. The results are shown in Table 1.

Example 5

Various operations, measurements, and evaluations were performed in the same way as in Example 1 with the exception that a highly soluble polymer B2 in which the proportional content of a nitrile group-containing monomer unit was within a specific range was used as the highly soluble polymer B. The results are shown in Table 1.

<Production of Highly Soluble Polymer B2>

A reactor A to which a mechanical stirrer and a condenser were attached was charged with 85 parts of deionized water and 0.2 parts of sodium dodecylbenzenesulfonate in a nitrogen atmosphere. The contents of the reactor A were heated to 55° C. under stirring, and a 5.0% aqueous solution of 0.3 parts of potassium persulfate was added into the reactor A. Next, a monomer mixture was produced in a vessel B that was separate to the reactor A by adding 94.0 parts of acrylonitrile as a nitrile group-containing monomer, 1.0 parts of acrylamide as a basic group-containing monomer, 2.0 parts of acrylic acid as an ethylenically unsaturated acid monomer, 3.0 parts of n-butyl acrylate as a (meth)acrylic acid ester monomer, 0.6 parts of sodium dodecylbenzenesulfonate, 0.035 parts of t-dodecyl mercaptan, 0.4 parts of polyoxyethylene lauryl ether, and 80 parts of deionized water into the vessel B in a nitrogen atmosphere and performing stirring and emulsification thereof. The monomer mixture was added into the reactor A at a constant rate over 5 hours while in a stirred and emulsified state and a reaction was carried out until the polymerization conversion rate reached 95% to yield a water dispersion of a polyacrylonitrile (PAN) copolymer (highly soluble polymer B2) including mainly acrylonitrile units (94 mass %). Next, a suitable amount of NMP was added to the obtained water dispersion of the highly soluble polymer B2 to obtain a mixture. Thereafter, vacuum distillation was performed at 90° C. to remove water and excess NMP from the mixture and thereby obtain an NMP solution (solid content concentration: 8%) of the highly soluble polymer B2.

Example 6

Various operations, measurements, and evaluations were performed in the same way as in Example 1 with the exception that a highly soluble polymer B1-2 produced as described below was used as the highly soluble polymer B. The results are shown in Table 1.
<Production of Highly Soluble Polymer B1-2>
A highly soluble polymer B1-2 was obtained in the same way as in production of the highly soluble polymer B1-1-1 in Example 1, etc., with the exception that styrene was not used and the charged amounts of monomers other than styrene were changed to 57 parts of acrylonitrile, 3 parts of methacrylic acid, and 40 parts of 1,3-butadiene. The iodine value of the obtained highly soluble polymer B1-2 was measured by the previously described method. The result is shown in Table 1.

Example 7

In production of the slurry composition for a secondary battery positive electrode, the same particulate polymer A as in Example 1, etc., and two types of the highly soluble polymer B were used as the binder. Note that the same highly soluble polymer B1-1-1 as in Example 1, etc., which had an iodine value of 10 g/100 g, and the same highly soluble polymer B2 as in Example 5, which had a nitrile group-containing monomer unit proportional content of 94 mass %, were used as the two types of the highly soluble polymer B. The mixing ratio of the highly soluble polymer B1-1-1 and the highly soluble polymer B2 was 50:50, by mass. With the exception of these points, various operations, measurements, and evaluations were performed in the same way as in Example 1. The results are shown in Table 1. Note that the total content of the entire binder used in the present example (particulate polymer A, highly soluble polymer B1-1-1, and highly soluble polymer B2) was 2 parts, and the mixing ratio of the two types of the highly soluble polymer B (i.e., the highly soluble polymer B1-1-1 and the highly soluble polymer B2) was 30:70, by mass.

Comparative Example 1

Various operations, measurements, and evaluations were performed in the same way as in Example 1 with the exception that 0.6 parts of the same particulate polymer A1 as in Example 1, etc., was used and the particulate polymer A2 was not used as the particulate polymer A used as the binder in production of the slurry composition for a secondary battery positive electrode. The results are shown in Table 1.

Comparative Example 2

Various operations, measurements, and evaluations were performed in the same way as in Example 1 with the exception that the amounts of emulsifier added in production of the particulate polymers A1 and A2 were changed such as to obtain particulate polymers satisfying the volume-average particle diameters shown in Table 1. The results are shown in Table 1.

Comparative Example 3

In production of the particulate polymers A1 and A2, the amounts of n-butyl acrylate (BA) and methyl methacrylate (MMA) as (meth)acrylic acid ester monomers were changed to 9.0 parts and 30.0 parts, respectively, and the amount of methacrylic acid (MAA) as an ethylenically unsaturated acid monomer was changed to 60.2 parts. Moreover, in production of the slurry composition for a secondary battery positive electrode, the mixing ratio of the particulate polymer A (particulate polymers A1 and A2) and the highly soluble polymer B (highly soluble polymer B1-1-1) was set as 90:10, by mass. Note that the quantitative ratio of the particulate polymer A1 and the particulate polymer A2 was 50:50, by mass. With the exception of these points, various operations, measurements, and evaluations were performed in the same way as in Example 1. The results are shown in Table 1.
In Table 1, shown below:
"BA" indicates n-butyl acrylate;
"MMA" indicates methyl methacrylate;
"MAA" indicates methacrylic acid;
"AMA" indicates allyl methacrylate;
"ST" indicates styrene;
"AN" indicates acrylonitrile;
"H-BD" indicates hydrogenated 1,3-butadiene unit;
"AB" indicates acetylene black;
"AAm" indicates acrylamide; and
"AA" indicates acrylic acid.

TABLE 1

| | | | | Examples | | | | | | | Comparative examples | | |
|---|---|---|---|---|---|---|---|---|---|---|---|---|---|
| | | | | 1 | 2 | 3 | 4 | 5 | 6 | 7 | 1 | 2 | 3 |
| Slurry composition for non-aqueous secondary battery electrode | Particulate polymer A (binder) | Chemical composition (same for A1 and A2) | Ethylenically unsaturated acid monomer Type | MAA | MAA | MAA | MAA | MAA | MAA | MAA | MAA | MAA | MAA |
| | | | Amount (parts by mass) | 5 | 5 | 5 | 5 | 5 | 5 | 5 | 5 | 5 | 60.2 |
| | | | (Methacrylic) acid ester monomer Type | MMA | MMA | MMA | MMA | MMA | MMA | MMA | MMA | MMA | MMA |
| | | | Amount (parts by mass) | 55.1 | 55.1 | 55.1 | 55.1 | 55.1 | 55.1 | 55.1 | 55.1 | 55.1 | 30 |
| | | | Type | BA | BA | BA | BA | BA | BA | BA | BA | BA | BA |
| | | | Amount (parts by mass) | 39.1 | 39.1 | 39.1 | 39.1 | 39.1 | 39.1 | 39.1 | 39.1 | 39.1 | 9 |
| | | | Cross-linkable monomer Type | AMA | AMA | AMA | AMA | AMA | AMA | AMA | AMA | AMA | AMA |
| | | | Amount (parts by mass) | 0.8 | 0.8 | 0.8 | 0.8 | 0.8 | 0.8 | 0.8 | 0.8 | 0.8 | 0.8 |
| | | Volume-average particle diameter | D50$_{A1}$ (nm) | 150 | 100 | 250 | 150 | 150 | 150 | 150 | 300 | 40 | 150 |
| | | | D50$_{A2}$ (nm) | 450 | 300 | 400 | 450 | 450 | 450 | 450 | 300 | 800 | 450 |
| | | | Volume-average particle diameter ratio (—) (D50$_{A2}$/D50$_{A1}$) | 3 | 3 | 1.6 | 3 | 3 | 3 | 3 | 1 | 20 | 3 |
| | Highly soluble polymer B (binder) | Highly soluble polymer B1 | Iodine value (g/100 g) | 10 | 10 | 10 | 50 | — | 5 | 10 | 10 | 10 | 10 |
| | | | Chemical composition | B1-1-1 ST/AN/ H-BD/ MAA | B1-1-1 ST/AN/ H-BD/ MAA | B1-1-1 ST/AN/ H-BD/ MAA | B1-1-2 ST/AN/ H-BD/ MAA | — | B1-2 AN/H- BD/MAA | B1-1-1 ST/AN/ H-BD/ MAA | B1-1-1 ST/AN/ H-BD/ MAA | B1-1-1 ST/AN/ H-BD/ MAA | B1-1-1 ST/AN/ H-BD/ MAA |
| | | Highly soluble polymer B2 | Type | — | — | — | — | B2 AN/AAm/ AA/BA | — | B2 AN/AAm/ AA/BA | — | — | — |
| | | | Chemical composition | — | — | — | — | 94 | — | 94 | — | — | — |
| | | | Nitrile group-containing monomer unit (mass %) | 30:70 | 30:70 | 30:70 | 10:90 | 30:70 | 30:70 | 30:70 | 30:70 | 30:70 | 90:10 |
| | Mixing ratio of polymers A and B (by mass) | | | | | | | | | | | | |
| | (A + B1)/(A + B) × 100 (%) | | | 100 | 100 | 100 | 100 | 30 | 100 | 65 | 100 | 100 | 100 |
| | Degree of swelling in electrolyte solution of mixture of polymers A and B (%) | | | 300 | 400 | 300 | 280 | 200 | 400 | 250 | 300 | 250 | 900 |
| | Amount of binder (parts by mass) | | | 1 | 1 | 1 | 1 | 1 | 1 | 1 | 1 | 1 | 1 |
| | Active material | Type | | NMC | NMC | NMC | NMC | NMC | NMC | NMC | NMC | NMC | NMC |
| | | Amount (parts by mass) | | 97 | 97 | 97 | 97 | 97 | 97 | 97 | 97 | 97 | 97 |
| | Conductive material | Type | | AB | AB | AB | AB | AB | AB | AB | AB | AB | AB |
| | | Amount (parts by mass) | | 2 | 2 | 2 | 2 | 2 | 2 | 2 | 2 | 2 | 2 |
| Evaluation | Electrode flexibility | | | A | A | A | A | C | A | A | A | C | D |
| | Peel strength | | | A | A | B | B | B | A | A | C | C | D |
| | Rate characteristics | | | B | B | B | B | A | B | A | C | C | D |
| | High-temperature storage characteristics | | | A | A | A | A | A | B | A | A | D | D |

It can be seen from Table 1 that it was possible to form an electrode mixed material layer having sufficiently high peel strength and to enhance battery characteristics of a secondary battery including an obtained electrode in Examples 1 to 7 in which the used binder composition contained a highly soluble polymer B and also contained particulate polymers A1 and A2 including an ethylenically unsaturated acid monomer unit in a proportion of not less than 1.0 mass % and not more than 10.0 mass %, including a (meth)acrylic acid ester monomer unit in a proportion of not less than 30.0 mass % and not more than 98.0 mass %, and having volume-average particle diameters satisfying $D50_{A2} > D50_{A1} \geq 50$ nm. It can also be seen from Table 1 that is was not possible to achieve a balance of increasing the peel strength of an obtained electrode mixed material layer and enhancing battery characteristics of a secondary battery including the electrode in Comparative Examples 1 and 2 in which the used binder composition contained a highly soluble polymer B and a particulate polymer for which the volume-average particle diameter did not satisfy the specific condition set forth above. It can also be seen through Comparative Example 3 that it was not possible to achieve a balance of increasing the peel strength of an obtained electrode mixed material layer and enhancing battery characteristics of a secondary battery including the electrode in a case in which a particulate polymer in which the proportional content of an ethylenically unsaturated acid monomer unit was more than 10.0 mass % was used.

INDUSTRIAL APPLICABILITY

According to the present disclosure, it is possible to provide a binder composition for a non-aqueous secondary battery electrode that can be suitably used to form an electrode mixed material layer having sufficiently high adhesiveness with a current collector (i.e., having sufficiently high peel strength) and that can enhance battery characteristics of a secondary battery including an obtained electrode.

Moreover, according to the present disclosure, it is possible to provide a slurry composition for a non-aqueous secondary battery electrode, and method of producing the same, that can form an electrode mixed material layer having excellent peel strength and that can enhance battery characteristics of a secondary battery including an obtained electrode.

Furthermore, according to the present disclosure, it is possible to provide an electrode for a non-aqueous secondary battery that can sufficiently improve battery characteristics of a non-aqueous secondary battery and a non-aqueous secondary battery that has excellent battery characteristics such as rate characteristics and high-temperature storage characteristics.

The invention claimed is:

1. A binder composition for a non-aqueous secondary battery electrode comprising a binder and an organic solvent, wherein
the binder includes a particulate polymer A and a polymer B,
the polymer B has N-methyl-2-pyrrolidone insoluble content of 50 mass % or less,
the particulate polymer A includes an ethylenically unsaturated acid monomer unit in a proportion of not less than 1.0 mass % and not more than 10.0 mass % and includes a (meth)acrylic acid ester monomer unit in a proportion of not less than 30.0 mass % and not more than 98.0 mass %, and
the particulate polymer A includes a particulate polymer A1 having a volume-average particle diameter of $D50_{A1}$ and a particulate polymer A2 having a volume-average particle diameter of $D50_{A2}$, where $D50_{A1}$ and $D50_{A2}$ satisfy a formula: 550 nm $\geq D50_{A2} \geq$ 300 nm, 300 nm $> D50_{A1} \geq$ 50 nm.

2. The binder composition for a non-aqueous secondary battery electrode according to claim 1, wherein a mixture of the particulate polymer A and the polymer B has a degree of swelling in electrolyte solution, mixture of ethylene carbonate (EC)/diethyl carbonate (DEC)=3/7 (volume ratio), including 2 volume % (solvent ratio) of vinylene carbonate, of not less than 150% and not more than 500%.

3. The binder composition for a non-aqueous secondary battery electrode according to claim 1, wherein the polymer B includes either or both of a polymer B1 that has an iodine value, measured in accordance with JIS K6235(2006), of not less than 3 g/100 g and not more than 80 g/100 g and in which proportional content of a nitrile group-containing monomer unit is 60.0 mass % or less and a polymer B2 that includes a nitrile group-containing monomer unit in a proportion of not less than 70.0 mass % and not more than 98.0 mass %.

4. The binder composition for a non-aqueous secondary battery electrode according to claim 1, wherein a content ratio of the particulate polymer A and the polymer B is 5:95 to 50:50.

5. A slurry composition for a non-aqueous secondary battery electrode comprising: the binder composition for a non-aqueous secondary battery electrode according to claim 1; and an electrode active material.

6. A method of producing a slurry composition for a non-aqueous secondary battery electrode that is a method of producing the slurry composition for a non-aqueous secondary battery electrode according to claim 5, comprising a mixing step of mixing the electrode active material, the particulate polymer A1, the particulate polymer A2, the polymer B, and the organic solvent.

7. An electrode for a non-aqueous secondary battery comprising an electrode mixed material layer formed using the slurry composition for a non-aqueous secondary battery electrode according to claim 5.

8. A non-aqueous secondary battery comprising the electrode for a non-aqueous secondary battery according to claim 7.

* * * * *